US009668086B2

(12) United States Patent
Zellner

(10) Patent No.: US 9,668,086 B2
(45) Date of Patent: May 30, 2017

(54) METHODS, DEVICES, AND COMPUTER READABLE STORAGE DEVICES FOR PROVIDING OPTIMIZED LOCATION INFORMATION

(71) Applicant: AT&T Intellectual Property I, L.P., Atlanta, GA (US)

(72) Inventor: Samuel N. Zellner, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 100 days.

(21) Appl. No.: 14/093,117

(22) Filed: Nov. 29, 2013

(65) Prior Publication Data
US 2015/0156603 A1   Jun. 4, 2015

(51) Int. Cl.
H04W 24/00 (2009.01)
H04W 4/02 (2009.01)
H04W 4/04 (2009.01)

(52) U.S. Cl.
CPC ............ H04W 4/02 (2013.01); H04W 4/046 (2013.01)

(58) Field of Classification Search
CPC ....................... H04W 4/00; H04W 4/02–4/046
USPC ..... 455/404.2, 414.1, 456.1–457; 370/310.2, 370/328
See application file for complete search history.

(56) References Cited

U.S. PATENT DOCUMENTS

| 7,427,950 | B2 | 9/2008 | Eslinger et al. |
| 7,904,096 | B2 | 3/2011 | Shyr et al. |
| 8,036,679 | B1 | 10/2011 | Barbeau et al. |
| 8,045,995 | B2 | 10/2011 | King et al. |
| 8,170,796 | B2 | 5/2012 | Liu et al. |
| 8,494,707 | B1 | 7/2013 | Bennah et al. |
| 8,504,077 | B2 | 8/2013 | Hodges |
| 2004/0029594 | A1 | 2/2004 | Brandes et al. |
| 2008/0195638 | A1* | 8/2008 | Winberry .......... G06F 17/30241 |
| 2010/0070160 | A1 | 3/2010 | Haatainen et al. |
| 2010/0131189 | A1* | 5/2010 | Geelen ................... G01C 21/32 701/533 |
| 2010/0207751 | A1* | 8/2010 | Follmer ............. G01C 21/3697 340/439 |
| 2012/0009904 | A1 | 1/2012 | Modi et al. |
| 2013/0169475 | A1 | 7/2013 | Lanes et al. |
| 2013/0326407 | A1* | 12/2013 | van Os ................... G01C 21/00 715/810 |

OTHER PUBLICATIONS

Varshavasky et al. "Location in Ubiquitous Computing" Ubiquitous Computing Fundamentals, Chapter 7, pp. 285-320 (2009), Pub Date interpreted as Jan. 2009.

* cited by examiner

Primary Examiner — Steve D Agosta
(74) Attorney, Agent, or Firm — Hartman & Citrin LLC

(57) ABSTRACT

Optimized location information is provided for a location based service. An event is detected which is indicative of an error in the location based service which degrades the performance of the location based service. A cause of the error is determined, and resolution of the error is initiated based on the determined cause.

17 Claims, 7 Drawing Sheets

METHODS, DEVICES, AND COMPUTER READABLE STORAGE DEVICES FOR PROVIDING OPTIMIZED LOCATION INFORMATION

TECHNICAL FIELD

The present disclosure relates generally to telecommunications, and, more particularly, to optimizing location based services.

BACKGROUND

Location based systems have become increasingly popular for mobile communication device users. Such systems obtain location data from location tracking systems, such as the Global Positioning System (GPS), and provide the location data to end user devices executing location-based applications. Such devices may include, for example, a navigation system in a vehicle, an application on a mobile device such as a handset, watch, tablet, computer, vehicle, etc.

While location based systems are useful, they are not perfect. As a result, applications that depend on location systems to provide location based services, such as navigation services, advertising services, nearby-attraction-indicating services, and other location based services may provide inaccurate information or may not function properly. This can result in significant problems for the end user or a third party trying to leverage the location data.

For example, if a location system provides inaccurate information to a navigation application, a user of the navigation application may take a longer route than necessary to get to a desired destination, resulting in wasted fuel. Even worse, the user may not find the desired destination or may get lost. If a location system provides inaccurate information to a location based service that advertises nearby products or services, the inaccurate information may lead the user to the wrong product or service or cause the user to spend time looking for products or services that are not available nearby. If a location system provides location information to application developers or other third parties, inaccurate location information may result in a loss of revenue or wasted investment.

As the number of applications leveraging location based services is increasing rapidly, it is becoming more important that location information provided by location systems is accurate.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an illustrative embodiment, a method is provided for optimizing location information provided for a location based service. The method includes detecting an event indicative of an error in the location based service which degrades the performance of the location based service, determining a cause of the error, and resolving the determined cause.

According to another embodiment, a device is provided for optimizing location information provided for a location based service. The device includes a processor and a memory. The memory has instructions stored thereon which, when executed by the processor, cause the processor to perform operations. The operations include detecting an event indicative of an error in the location based service which degrades the performance of the location based service, determining a cause of the error, and the determined cause.

According to another embodiment, a computer-readable storage device is provided for optimizing location information provided for a location based service. The computer readable storage device has instructions stored thereon which, when executed by a processor, cause the processor to perform operations. The operations include detecting an event indicative of an error in the location based service which degrades the performance of the location based service, determining a cause of the error, and the determined cause.

DETAILED DESCRIPTION

Detailed illustrative embodiments are disclosed herein. It must be understood that the embodiments described and illustrated are merely examples that may be embodied in various and alternative forms, and combinations thereof. As used herein, the word "illustrative" is used expansively to refer to embodiments that serve as examples or illustrations. The figures are not necessarily to scale and some features may be exaggerated or minimized to show details of particular components. Specific structural and functional details disclosed herein are not to be interpreted as limiting.

A challenge in providing accurate location information is identifying problems that occur which cause inaccurate location information. Once a problem is identified, a determination needs to be made whether the problem is valid or is due to a user error or perhaps due to an intentional design before action is initiated to isolate and resolve the problem. If a problem is valid, the cause of the problem needs to be isolated. As more applications use location information in various ways, isolation of such problems is becoming more complex. Once the cause of a problem is isolated, corrective actions need to be taken to resolve the problem, taking into account the user, the current status of the user, applications in use, system status, and available options. For example, if the user is in the process of navigating to a destination and the location system is not functioning properly, it is important that the user's status is taken into account in correcting the problem.

According to illustrative embodiments, the problems that flow from inaccurate location information are addressed in a manner that allows a user, an application server, a network provider, and a location information provider to correct or compensate for errors or inaccuracies in location information. Problems due to location information that may be addressed according to illustrative embodiments include, but are not limited to location system errors in accuracy (e.g., the location information provided by the location system has an accuracy of 10 feet from a location), systematic errors in accuracy (e.g., the location information provided by the location system is off to the North by 10 feet), location specific errors in accuracy (e.g., in downtown New York City, the accuracy of the location information provided by the location system is 50 feet from a location), application-type errors in accuracy (e.g., a map provided by an application is off to the North by 10 feet), time of day errors in accuracy (e.g., the location information provided by the location system is delayed by 30 seconds during busy hours), and environmental errors in accuracy (e.g., the location information provided by the location system is inaccurate due to sun spots), etc.

Figure 1A:
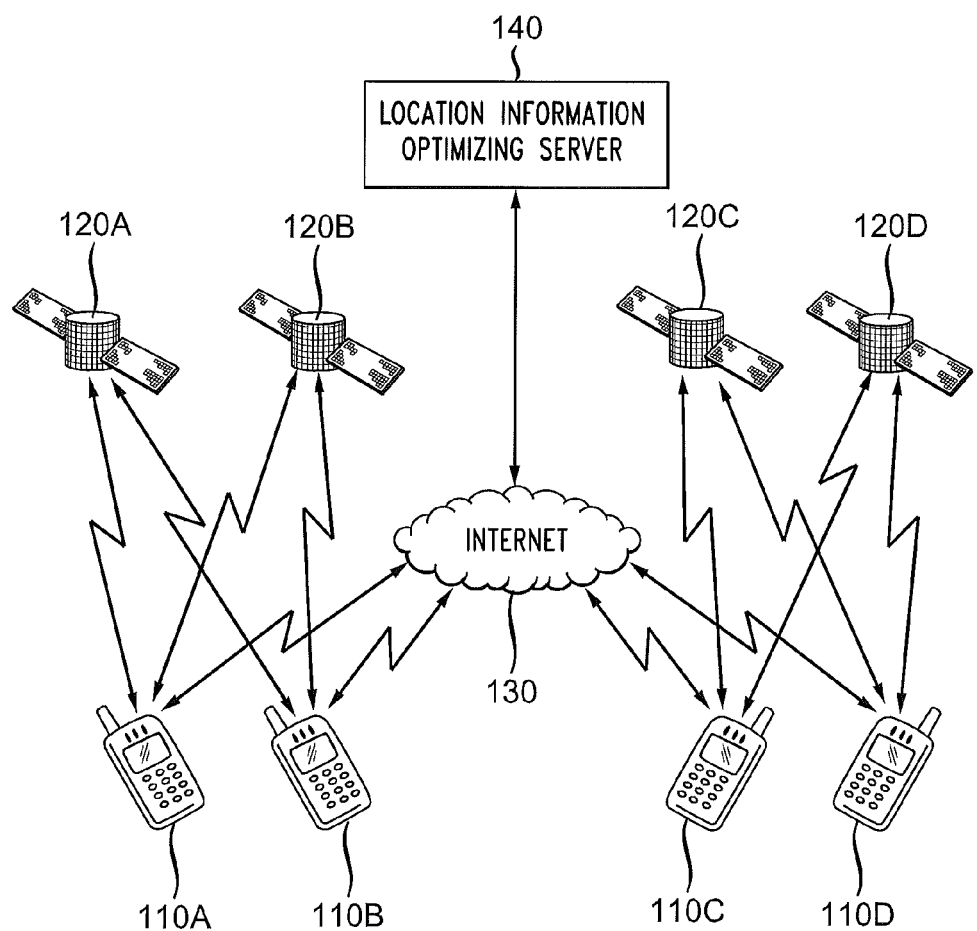
FIG. 1A illustrates an environment in which a system for providing optimized location information may be implemented according to an illustrative embodiment.

FIG. 1A illustrates an environment in which a system for providing optimized location information may be implemented according to illustrative embodiments. As shown in FIG. 1A, mobile communication devices 110A, 110B, 110C, 110D are in communication with a location information optimizing server 140 via a network 130, such as the Internet. The mobile communication devices 110A, 110B, 110C and 110D may include, e.g., mobile phones, built-in vehicle navigation systems, etc.

Details of a device with which the mobile communication devices 110A, 110B, 110C, and 110D may be implemented are described below with reference to FIG. 2. The location information optimizing server 140 may be implemented with a computing device, such as that described below with reference to FIG. 3.

The mobile communication devices 110A, 110B, 110C, and 110D are equipped with location-tracking capabilities so that their locations may be tracked. Also, the mobile communication devices 110A, 110B, 110C, and 110D may include applications that use location information to provide location based services.

As shown in FIG. 1A, the mobile communication devices 110A and 110B receive radio signals from GPS satellites 120A and 120B, and the mobile communication devices 110C and 110D receive radio signals from GPS satellites 120C and 120D. It should be appreciated that while four GPS satellites 120A, 120B, 120C and 120D are shown for simplicity of illustration, the mobile communication devices 110A, 110B, 110C, and 110D may receive radio signals from more GPS satellites.

As those skilled in the art would appreciate, the radio signals transmitted from the GPS satellites 120A, 120B, 120C, and 120D include information indicating the locations of the GPS satellites. The mobile communication devices 110A and 110B determine their locations by estimating the distance to the satellites 120A and 120B. Similarly, the mobile communication devices 110C and 110D determine their locations by estimating the distance to the satellites 120C and 120D. By communicating with the GPS satellites 120A, 120B, 120C and 120D, the mobile communication devices 110A, 110B, 110C, and 110D are able to determine their respective locations.

While a GPS system is described herein as an example of a location system, it should be appreciated that other location systems, such as triangulation, may be used by the mobile communication devices 110A, 110B, 110C, and 110D. The concepts described herein may be applicable to any location system which provides the mobile communication devices 110A, 110B, 110C and 110D with location information for tracking purposes for a navigation application and for use in other applications using location information.

Though only four mobile communication devices are shown in FIG. 1A for simplicity of illustration, it should be appreciated that any number of mobile communication devices may use the concepts described herein to be provided with optimized location information.

The location system that provides location information to the mobile communication devices 110A, 110B, 110C, and 110D, may include network components, such as a GPS reference network data database 150, a Location Measurement Unit (LMU) 106, and a Location/Positioning Determination Entity (PDE) 109, as described with reference to FIG. 1B, as well as transceivers which send and receive location information. The location system may also include the location based applications included in the mobile communication devices 110A, 110B, 110C, and 110D, such as navigation applications, advertising applications, etc.

According to an illustrative embodiment, upon detection of an event indicating an error in location information which degrades the performance of a location based service for at least one of a user of a mobile communication device, such as the mobile communication devices 110A, 110B, 110C, and 110D, a service provider, and a third party, the location information optimizing server 140 takes step to identify the cause of the error and correct or compensate for the error. For ease of explanation, the description that follows focuses on detecting errors in location information which degrade the performance of location based services, such as navigation services, provided to the mobile communication devices 110A, 110B, 110C, and 110D.

According to an illustrative embodiment, the location information optimizing server 140 may detect an event indicative of an error in location information by receiving a report indicative of the error from the mobile communication device experiencing the error. For example, if the mobile communication device 110A experiences an error in location information, the mobile communication device 110A may report this error to the location information optimizing server 140. This report may be provided responsive to user input indicating that there is an error.

Alternatively, an application on the mobile communication device 110A may automatically report an error in location information, e.g., if the location system is not responding to the application.

According to an illustrative embodiment, the location information optimizing server 140 determines whether the error is caused by, for example a conflict in a map provided to the mobile communication device and an actual location of the mobile communication device, movement of the mobile communication device that is inconsistent with the map provided to the mobile communication device, a user-generated modification to the map provided to the mobile communication device, or a defect in a component of the location system, e.g., an application on the mobile communication device or another component of the location system that results in an inability to determine a location of the mobile communication device or an inability to provide a map for a route. In addition, the location information optimizing server 140 may determine a cause of an error based on a report of the error by a user of a mobile communication device.

Depending on the cause of the error, the location information optimizing server 140 takes steps to resolve and/or compensate for the error. According to an illustrative embodiment, the location information optimizing server 140 may resolve and/or correct for the error by, for example adjusting or trimming location information (such as location information included in a map provided by a navigation application), correcting a map provided by a navigation application (globally for all users or just for a mobile communication device that reports an error), selecting a different map source, selecting a different location system (e.g., changing from GPS to a WiFi location system), and/or utilizing a different application on the mobile communication device.

To understand the steps taken by the location information optimizing server 140 in resolving and/or compensating for the error, consider the following scenarios.

In a first scenario, a mobile communication device, such as the mobile communication device 110A, experiences a conflict between a map provided by the location system and actual location data. For example, a map provided by navigation system in a vehicle may indicate that there is a forest with no road at a particular location while the vehicle is, in fact, driving on a road through the forest at a speed of 40 mph. This error may be reported to the location information optimizing server 140, e.g., responsive to a user input at the mobile communication device 110A. As an alternative, the location information optimizing server 140 may monitor the mobile communication device 110A and infer that there is in an error in the map, based on the mobile communication device's 110A movement.

In response to the error, the location information optimizing server 140 determines whether the error is due to a defect in the map. Due to the movement of the mobile communication device 110A at 40 mph, the location information optimizing server 140 may infer that the error is due to a defect in the map.

The location information optimizing server 140 may also determine whether the error in the map has been reported by other mobile communication devices or inferred by the location information optimizing server 140 based on the movement of other mobile communication devices. If the error in the map is unique to the mobile communication device in the vehicle driving through the forest, the location information optimizing server 140 may update the map for that mobile communication device or provide an alternate map. If the error in the map has been reported or inferred with respect to other mobile communication devices, the location information optimizing server 140 may update the maps globally for all the mobile communication devices.

Continuing the description of the first scenario, the location information optimizing server 140 may determine that the conflict in the map is not due to a map defect. For example, the location information optimizing server 140 may query a map database to obtain a current map and determine that the map indicates that there is a road in the forest. In this case, the error may be due to the application in the mobile communication device 110A or other components of the location system not obtaining the current map. The location information optimizing server 140 determines which component caused the error, e.g., by sending test signals to each of the components and the application. Based on the response of the network components and the application, the location information optimizing server 140 identifies what part of the location system is causing the error and initiates correction of the error. For example, if the error is discovered to be caused by the application, e.g., because the application is non-responsive to a test signal sent from the location information optimizing server 140, then the location information optimizing server 140 may notify the user such that the application may be restarted/recalibrated.

In addition to or as an alternative to sending a test signal, the location information optimizing server 140 may determine that there is an error in the application by examining other aspects of the application that utilize location information. For example, if the application is supposed to turn a ringer off when the mobile communication device 110A is in a certain location, but the location information optimizing server 140 determines that the ringer is not off when the mobile communication device 110A is in that certain location, the location information optimizing server 140 may determine that there is an error in location processing by the application.

If the location information optimizing server 140 determines that there is an error in the application, the location information optimizing server 140 may notify the application developer so that the error may be corrected, in case the error is due to a defect in the application code, not just in the application residing on the mobile communication device that experienced an error. The location information optimizing server 140 may notify the application developer only if other mobile communication devices experience the same or similar errors with the application.

If the error is due to a component of the location system in the cellular network, the location information optimizing server 140 may notify the cellular network provider so that corrective measures may be taken. For example, if the error is determined to be due to a non-responsive transceiver within the cellular network, the location information optimizing server 140 may notify the cellular network provider such that location information traffic may be diverted to another component until the error is corrected.

The location information optimizing server 140 may also identify which component of the location system caused the error by examining location data provided by components of the location system. For example, if the error is determined to be due to a mistake in data provided by the GPS reference network data database 150, the location information optimizing server 140 may notify the cellular network provider such that the data may be corrected.

In a second scenario, an error in location information is discovered/reported due to the act of a user, e.g., a user modification of a map provided by a navigation application on a mobile communication device. For example, a user may encounter a wall in a location but a map provided by an application on a mobile communication device indicates that there is no wall at that location. The user may alter the map to indicate that there is a wall. This modification may be reported to the location information optimizing server 140, and/or the location information optimizing server 140 may monitor the mobile communication device to detect the map modification.

The location information optimizing server 140 may keep track of a number of times that the user alters the map in such a way such that if the map alteration occurs a number of times that meet a threshold, the location information optimizing server 140 may permanently alter the map. The threshold may also be time-based. For example, if the user only alters the map once, the wall may be temporary. In such a case, the location information optimizing server 140 would not alter the map. However, if the user alters the map twenty times over a six month period, this may be an indication that the wall is not temporary. In such a case, the location information optimizing server 140 may alter the map. If the same map alteration is reported/discovered with respect to other mobile communication devices, the location information optimizing server 140 may globally update the map for all the mobile communication devices.

Continuing the description of the second scenario, in addition to keeping track of the number of times the user alters a map, the location information optimizing server 140 may determine whether the alteration is due to a user error. For example, the user may alter the map to indicate that there is a wall, when in fact there is no wall. The location information optimizing server 140 may make this determination based, e.g., upon actions of other mobile communication devices within an area nearby the wall. If none of the users of the other mobile communication devices alter the map, the location information optimizing server 140 may determine that the alteration by one user is in error. In this case, the map would not be altered. It should be appreciated that the user may override a map to include an alteration at any time.

In all the scenarios described above, the location information optimizing server 140 may keep a user history for the mobile communication devices and may store the history in a database, as described below with reference to FIG. 3. Also, the location information optimizing server 140 may notify users about errors and map modifications.

In addition, in all of the scenarios described above, the location information optimizing server 140 may react in real time. Thus, errors in location information may be identified and corrected/compensated for in real time to ensure that the end user has a good experience with a location-based application.

According to an illustrative embodiment, the location information optimizing server 140 takes a mobile communication device's status into account in initiating an action to resolve an error in location information. For example, if a mobile communication device is stationary and not executing any location based applications, the location information optimizing server 140 may react less quickly to a reported/discovered error than if a mobile communication device is in motion and is executing a navigation application. The active applications or active device modes (e.g., Bluetooth active, video camera, WiFi connected, etc.) on the communication device may also be taken into account. These applications or modes may provide insight regarding the user state, location system operations and may be helpful in evaluating the performance of the location system. In addition, the location information optimizing server 140 may take into account the user, other applications in use on the mobile communication device, system status and available options in determining corrective actions to take to address an error in location information.

According to an illustrative embodiment, the location information optimizing server 140 may take action only if a reported or a discovered error in location information is of a certain magnitude that meets a predetermined threshold. For example, if a mobile communication device reports that directions provided by a navigation application are off by 5 feet in latitude, longitude or altitude or a combination, the location information optimizing server 140 may not take action. However, if the mobile communication device reports that directions provided by the navigation application are off by 10 or more feet, the location information optimizing server 140 may take action to determine the cause of the error and correct or compensate for it.

The tolerance of the location information optimizing server 140 may depend on an environment in which the mobile communication device experiences errors, such that there are different thresholds that must be met before the location information optimizing server 140 takes action, depending on the environment. For example, if the mobile communication device is in a desert with sun spots or is in a downtown area with high buildings, the magnitude threshold of the discovered or reported error may be set high, e.g., an inaccuracy of 30 feet, for the location information optimizing server 140 to take action. By contrast, if the mobile communication device is an uncrowded area with good reception, the magnitude threshold of the discovered/reported error may be set low, e.g., an inaccuracy of 10 feet, for the location information optimizing server 140 to take action.

According to another illustrative embodiment, the location information optimizing server 140 may perform statistical analysis of reported/discovered errors to determine the cause and the best way to correct/compensate for errors. For example, the reported/discovered errors may not be as simple as a map being off by 10 feet. Rather, there may be many different errors in location information reported/discovered by various mobile communication devices, and the location information optimizing server 140 may determine trends based on the errors and take action to discover the cause of the errors and initiate corrective action based on those trends.

According to another embodiment, the location information optimizing server 140 and/or the mobile communication devices 110A, 110B, 110C and 110D may include an application having a learning mode to correct, update or add to a location information database. For example, a user of the application may be notified by the application that a desired location he/she is trying to find or a route being taken is not found in the current map database. The application may go into a learning mode, either automatically or responsive to user input, to record and document the desired location and/or route. As part of the learning mode, images, video, sounds, and other sensory data (e.g., smells, temperature, wind, etc.) and physical attributes (e.g., road type, road conditions, people, animals, buildings, etc.) associated with the location and/or route may be recorded.

According to yet another embodiment, the location information optimizing server 140 may conduct tests, e.g., randomly or periodically, to determine accuracy of location information provided by the location system. For example, the location information optimizing server 140 may query a mobile communication device, asking the device for its location. The location information optimizing server 140 may determine, based on the response from the mobile communication device, accuracy of the location information. The location information optimizing server 140 may proactively take action to identify the cause of an inaccuracy in the location information and correct the inaccuracy using any of the various techniques described above.

Although the embodiments described above are directed to actions taken by the location information optimizing server 140 to identify an error in location data and correct or compensate for the error, it should be appreciated that some or all of these actions may be performed by an application included in a mobile communication device (or a mobile device including a mobile communication device).

Figure 1B:
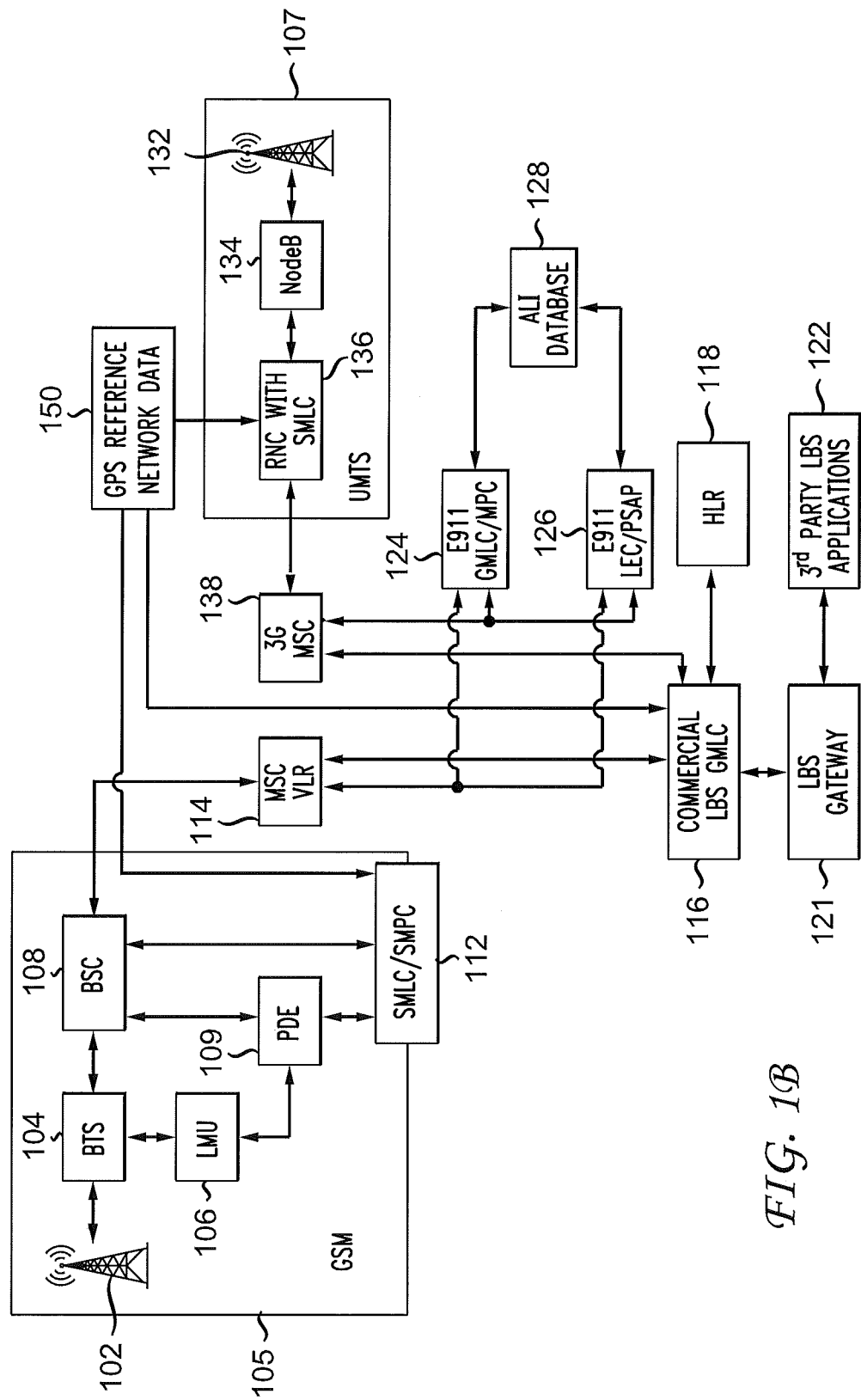
FIG. 1B illustrates, in detail, a cellular network environment in which illustrative embodiments may be implemented.

The embodiments described herein may be implemented in wireless networks that use illustrative telecommunications standards, such as Global System for Mobile communications (GSM) and Universal Mobile Telecommunications Systems (UMTS) as illustrated in FIG. 1B. It should be understood, however, that the embodiments may be implemented in wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

FIG. 1B illustrates details of a wireless communications network in which a system for providing optimized location information may be implemented according to an illustrative embodiment. The network shown in FIG. 1B includes two radio access networks (RAN). A first RAN 105, illustrated in the upper left hand portion of FIG. 1B, is dedicated to GSM-based network access. A second RAN 107, illustrated in the upper right hand portion of FIG. 1B, is dedicated to UMTS-based network access. The subject disclosure is not limited to the illustrated embodiments for GSM and UMTS network access. Other access technologies are contemplated, such as LTE, as described above. The first RAN 105 is described immediately below.

The first RAN 105 includes one or more base transceiver stations (BTS) 104 for communicating with mobile communication devices. Although not shown for simplicity of illustration, it will be appreciated that the mobile communication devices may include, for example, mobile phones, portable computers with integrated, external, removable network access cards, etc. The BTS 104 is the terminating node for the radio interface in the first RAN 105. The BTS 104 can include one or more transceivers 102 and can be responsible for ciphering of the radio interface.

The BTS 104 is in communication with a base station controller (BSC) 108. The BSC 108 is configured to allocate radio resources to the mobile communication devices in communication with the BTS 104, administer frequencies, and control handovers between BTS's. Although illustrated as a distinct element, the BSC 108 functions can be incorporated in the BTS 104.

The BTS 104 is also in communication with a Location Measurement Unit (LMU) 106, which is, in turn, in communication with a Location/Positioning Determination Entity (PDE) 109. The PDE 109 calculates the location of mobile communication devices using measurements taken by the mobile communication devices and/or the LMU 106. The BSC 108 is also in communication with the PDE 109 and a Serving Mobile Location Center (SMLC)/Serving Mobile Locationing/Positioning Center (SMPC) 112. The SMLC/SMPC 112 determines the locations of the mobile communication devices based on data from the PDE 109 and data from a location-determining system, e.g., a GPS system including GPS reference network data database 150.

The SMLC/SMPC 112 provides location information back to the BSC 108, and the BSC 108 provides the location information to a Mobile Switching Center (MSC) 114.

The MSC 114 is configured to function as a mobile telecommunications switch. When the MSC 114 receives a communication from the BSC 108 and recognizes the communication as an emergency or location-based communication from a mobile communication device, the MSC 114 retrieves location information for the mobile communication device from the BSC 108.

The MSC 114 is also in communication with location databases, such as a visiting location register (VLR) that may be collocated with the MSC 114, and a home location register (HLR) 118. The VLR can be logically associated with the MSC 114 as illustrated or can be a separate network element. The VLR is a database configured to store all subscriber data that is required for call processing and mobility management for mobile subscribers that are currently located in an area controlled by the VLR.

The HLR 118 is a database configured to provide routing information for mobile terminated (MT) calls and various messaging communications. The HLR 118 is also configured to maintain subscriber data that is distributed to the relevant VLR through the attach process and mobility management procedures, such as location area and routing area updates.

For providing location-based services, the HLR 118 is in communication with the MSC 114 and the VLR via a Commercial Location-Based Service (LBS)/Gateway Mobile Location Center (GMLC) 116. The Commercial LBS GMLC 116 communicates with the HLR 118 to acquire user information. The Commercial LBS GMLC 116 also communicates with and one or more third party LBS applications 122 via a LBS Gateway 121 to provide location-based services to mobile communication devices communicating with the network, such as navigational services, fleet tracking, etc.

For providing emergency services to the mobile communication devices, the MSC 114 is in communication with an E911 GMLC/Mobile Locationing Center (MPC) 124 and an E911 Local Exchange Carrier (LEC)/PSAP 126. The E911 GMLS/MPC 124 and the E911 LEC/PSAP 126 communicate with an ALI database (ALI DB) 128 containing information representing a caller's location. The E911 GMLC/MPC 124 and the E911 LEC/PSAP 126 match a number of an inbound call, e.g., an inbound telephone number or ANI information, to a corresponding location of the caller stored in the ALI DB 128 and then deliver both the number and the location to the appropriate emergency service, e.g., fire, police, and or ambulance, for dispatch.

The second RAN 107, illustrated in the upper right hand portion of FIG. 1B, is dedicated to UMTS-based network access and is now described. Mobile communication devices, such as mobile phones and portable computers, may communicate with the RAN 107 via one or more Node Bs 134. The Node B 134 is the terminating node for the radio interface in the second RAN 107. Each Node B 134 can include one or more transceivers 132 for transmission and reception of data to and from the mobile communication devices across the radio interface. Each Node B 134 is configured to apply codes to describe channels in a CDMA-based UMTS network. Generally, the Node B 134 performs similar functions for the UMTS network that the BTS 104 performs for the GSM network.

The Node B 134 is in communication with a radio network controller (RNC) 136. The RNC 136 is configured to allocate radio resources to the mobile communication devices, administer frequencies, and control handovers between Node B's 134. Generally, the RNC 136 performs similar functions for the UMTS network as the BSC 108 performs for the GSM network.

As shown in FIG. 1B, the RNC 136 includes an SMLC for determining a location of the mobile communication device based on data from the GPS reference network data database 150. As an alternative, the SMLC may be included as a distinct element. The RNC 136 is in communication with a 3G MSC 138, which performs similar functions as the MSC 114. Upon receipt of an emergency or location-based services call from a mobile communication device, the 3G MSC 138 communicates with the RNC 136 to obtain information regarding the location of the mobile communication device.

The 3G MSC 138 is also in communication with the Commercial LBS GMLC 116, the E911 GMLS/MPC 124, and the E911 LEC/PSAP 126, which perform the same functions for the UMTS network as described above for the GSM network.

According to the embodiment described above, the location information optimizing server 140 may be a third party device in communication with the mobile communication devices 110A, 110B, 110C, 110D via the Internet. Alternatively, the location information optimizing server 140 may be implemented as part of the cellular network communicating with the mobile communication devices 110A, 110B, 110C, 110D via the MSCs 114 and 138. As yet another alternative, some or all of the functionality of the location information optimizing server 140 may be provided in the mobile communication devices 110A, 110B, 110C, 110D.

Figure 2:
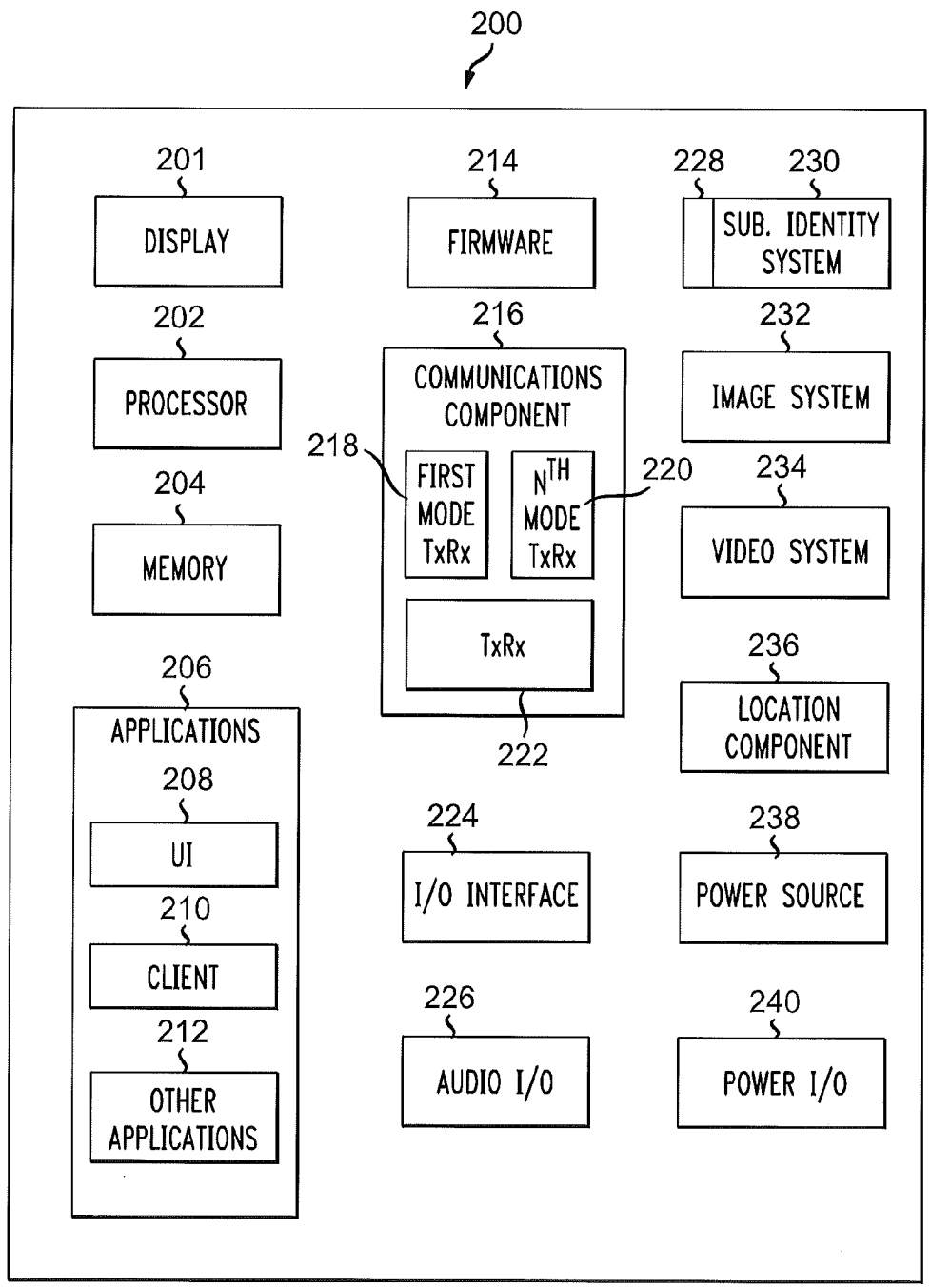
FIG. 2 illustrates in detail a mobile communication device according to an illustrative embodiment.

FIG. 2 illustrates a schematic block diagram of an illustrative device 200 with which the mobile communication devices 110A, 110B, 110C, and 110D may be implemented, according to an illustrative embodiment. The device 200 may be a multimode handset and can include a variety of computer-readable media. Although no connections are shown between the components illustrated in FIG. 2, those skilled in the art will appreciate that the components can interact with each other via any suitable connections to carry out device functions.

The device 200 may include a display 201 for displaying multimedia, such as, for example, text, images, video, and telephone functions, such as Caller ID data, setup functions, menus, music metadata, messages, wallpaper, graphics, Internet content, device status, preference settings, and the like.

The device 200 may include a processor 202 for controlling and/or processing data. A memory 204 can interface with the processor 202 for the storage of data and/or applications 206. The applications 206 may include, for example, SMS messaging software, EMS message software, MMS messaging software, USSD software, a WAP browser, and the like. The data may include, for example, power emission levels for short-range radio signals emitted from mobile communication devices, data indicating the frequency with which location data should be collected and reported when the device is at a particular location, a particular type of location, when the device is moving, when the device is static, etc.

The applications 206 may also include a user interface (UI) application 208. The UI application 208 can interact with a client 210 (e.g., an operating system) to facilitate user interaction with device functionality and data, for example, viewing received messages, answering/initiating calls, entering/deleting data, password entry and settings, configuring settings, address book manipulation, and the like. The UI application 208 may also interact with the client to facilitate user input regarding alterations to maps provided by a navigation application included in the applications 206. Such user interaction may be facilitated via, e.g., a keypad or a touchscreen included in the device 200 or communicating with the device via the I/O interface 224.

The applications 206 may include other applications 212, such as, for example, add-ons, plug-ins, email applications, music application, video applications, camera applications, location-based service (LSB) applications, power conservation applications, game applications, productivity application, entertainment applications, combinations thereof, and the like, as well as subsystem and/or components. The other applications 212 may also include applications for performing actions described above, such as altering a map provided by a navigation application, reporting an error in location information, etc. In addition, the other applications 212 may also include applications for identifying and correcting an error in location information.

The applications 206 can be instructions contained on computer-readable media, excluding propagating signals and may be stored in the memory 204. The applications may, alternatively, be stored in firmware components 214. The applications may be executed by the processor 202. The memory 204 and/or firmware 214 can also store code for execution during initialization of the device 200.

A communications component 216 may interface with the processor 202 to facilitate wired/wireless communication with external systems including, for example, cellular networks, location systems, VoIP networks, local area networks (LAN's), wide area networks (WAN's), metropolitan area networks (MAN's), personal area networks (PAN's), and other networks, which may be implemented using WIFI, WIMAX, combinations and improvements thereof, and the like. The communications component 216 can also include a multimode communication subsystem for providing cellular communications via different cellular technologies. For example, a first cellular transceiver 218 can operate in one mode, for example, a Global System for Mobile communications (GSM) mode, and an Nth transceiver 220 can operate in a different mode, for example a Universal Mobile Telecommunications Systems (UMTS) mode. While only two transceivers 218, 220 are illustrated, it should be appreciated that a plurality of transceivers may be included.

Also, it should be appreciated that the device 200 may include transceiver for operating in cellular modes other than GSM and UMTS. Such modes may operate according to standards for wireless networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2G, 2.5G, 3G, 4G, and greater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

The communications component 216 may also include a transceiver 222 for other communication technologies, such as, for example, WIFI, WIMAX, BLUETOOTH, infrared, IRDA, NFC, RF, and the like. The communications components 216 may also facilitate reception from terrestrial radio networks, digital satellite radio networks Internet based radio service networks, combinations thereof, and the like. The communications component 216 can process data from a cellular network, a corporate network, a home broadband network, a WIFI hotspot, and the like via an ISP, DSL provider, or broadband provider.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 224 can be used for communication between the device 200 and a network or local device instead of, or in addition to, the communications component 216.

Audio capabilities may be provided by an audio I/O component 226 that may include a speaker for the output of audio signals and a microphone to collect audio signals.

The device 200 can include a slot interface 228 for accommodating a subscriber identity system 230 such as, for example, a subscriber identity module (SIM) or universal SIM (USIM). The subscriber identity system 230 instead can be manufactured into the device 200, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 200 can further include an image capture and processing system 232 (image system). Photos and/or videos can be obtained via an associated image capture subsystem of the image system 232, for example, a camera. The device 200 may also include a video system 234 for capturing, processing, recording, modifying, and or transmitting video content.

A location component 236 may be included to send and/or receive signals such as, for example, GPS data, A-GPS data, WIF/WIMAX and or cellular network triangulation data, combinations thereof, and the like. The location component 236 can interface with cellular network nodes, telephone lines, satellites (such as satellites 120A, 120B, 120C, and 120D), location transmitters and/or beacons, wireless network transmitters and receivers, for example, WIFI hotspots, radio transmitters, combinations thereof and the like. The device 200 may obtain, generate, and/or receive data to identify its location or can transmit data used by other devices, to determine the device location. The location of the device 200 can be stored locally in the device 200 and reported to the location information optimizing server 140, e.g., upon request of the location information optimizing server 140.

The device 200 may also include a power source 238, such as batteries and/or other power subsystems (AC or DC). The power source 238 can interface with an illustrative power system or charging equipment via a power I/O component 240.

Figure 3:
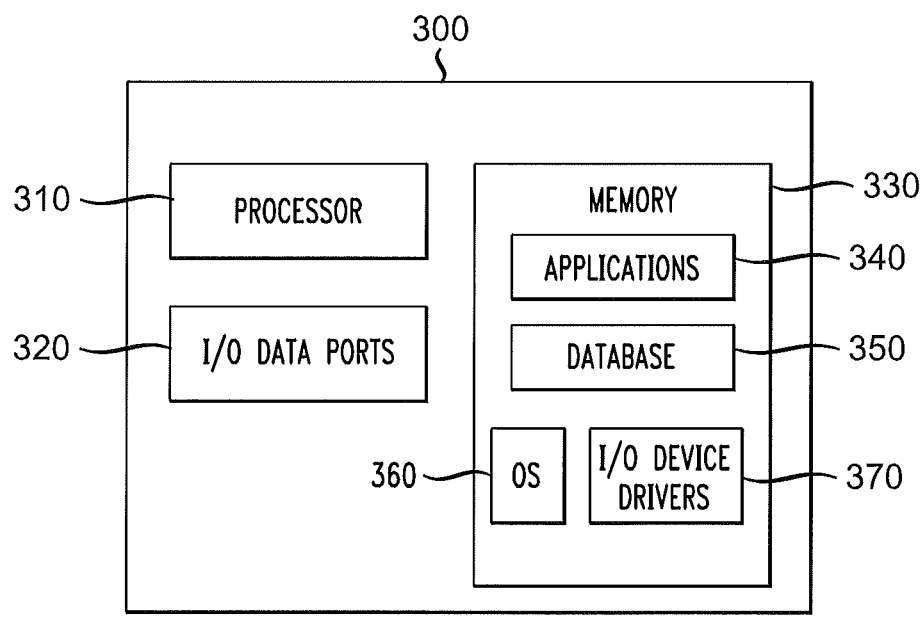
FIG. 3 illustrates a computing device for providing optimized location information according to an illustrative embodiment.

FIG. 3 is a block diagram of a device 300 with which the location information optimizing server 140 may be implemented according to an illustrative embodiment. The device 300 includes a processor 310 that receives information, such as information indicating the locations of the mobile communication devices 110A, 110B, 110C, 110D, as well as information indicating alterations to maps and information indicating map conflicts from the mobile communication devices 110A, 110B, 110C, and 110D. This information is received via I/O Data Ports 320. The processor 310 may also request such information via the I/O Data Ports 320. The I/O Data Ports 320 can be implemented with, e.g., an interface including an antenna or other suitable type of transceiver through which data and signals may be transmitted and received.

The processor 310 communicates with a memory 330 via, e.g., an address/data bus (not shown). The processor 310 can be any commercially available or customer processor. Additionally, although illustrated and described as one processor, the processor 310 may be implemented with multiple processors, which could include distributed processors or parallel processors in a single machine or multiple machines. Further, it should be appreciated that the processor can be used in supporting a virtual processing environment. Also, the processor may include a state machine, an application specific integrated circuit (ASIC), a programmable gate array (PGA) including a Field PGA, or a state machine.

The memory 330 is representative of the overall hierarchy of memory devices containing the software and data used to implement the functionality of the device 300. The memory 330 can include, but is not limited to, the following types of devices processor registers, processor cache, RAM, ROM, PROM, EPROM, EEPROM, flash memory, SRAMD, DRAM, other volatile memory forms, and non-volatile, semi-permanent or permanent memory types for example, tape-based media, optical media, solid state media, hard disks, combinations thereof, and the like, excluding propagating signals.

As shown in FIG. 3, the memory 330 may include several categories of software and data used in the device 300, including, applications 340, a database 350, an operating system (OS) 360, and the input/output (I/O) device drivers 370. As will be appreciated by those skilled in the art, the OS 360 may be any operating system for use with a data processing system. The I/O device drivers 370 may include various routines accessed through the OS 360 by the applications 340 to communicate with devices, and certain memory components. The applications 340 can be stored in the memory 330 and/or in a firmware (not shown) as executable instructions, and can be executed by the processor 310. The applications 340 include various programs that, when executed by the processor 310, implement the various features of the device 300, including applications for requesting and receiving location information, map conflict information, and map alteration information from the mobile communication devices 110A, 110B, 110C, and 110D, analyzing the information to determine a cause of an error, and taking action to correct and/or compensate for the error. The applications 340 may be applied to data stored in the database 350, such as maps, user history data, and data received via the I/O data ports 320, such as the location information received from the mobile communication devices 110A, 110B, 110C, and 110D. Alternatively, maps may be stored outside of the device 300 and obtained by the processor 310 via the I/O data ports 320. The database 350 represents the static and dynamic data used by the applications 340, the OS 360, the I/O device drivers 370 and other software programs that may reside in the memory.

While the memory 330 is illustrated as residing proximate the processor 310, it should be understood that at least a portion of the memory 330 can be a remotely accessed storage system, for example, a server on a communication network, a remote hard disk drive, a removable storage medium, combinations thereof, and the like. Thus, any of the data, applications, and/or software described above can be stored within the memory 330 and/or accessed via network connections to other data processing systems (not shown)

that may include a local area network (LAN), a metropolitan area network (MAN), or a wide area network (WAN), for example.

It should be understood that FIGS. 2 and 3 in the description above are intended to provide a brief, general description of a suitable environment in which the various aspects of some embodiments of the present disclosure can be implemented. While the description refers to computer-readable instructions, embodiments of the present disclosure also can be implemented in combination with other program modules and/or as a combination of hardware and software in addition to, or instead of, computer readable instructions. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like. The term "computer-readable media" and variants thereof, as used in the specification and claims, can include storage media, excluding propagating signals. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information.

Figure 4A:
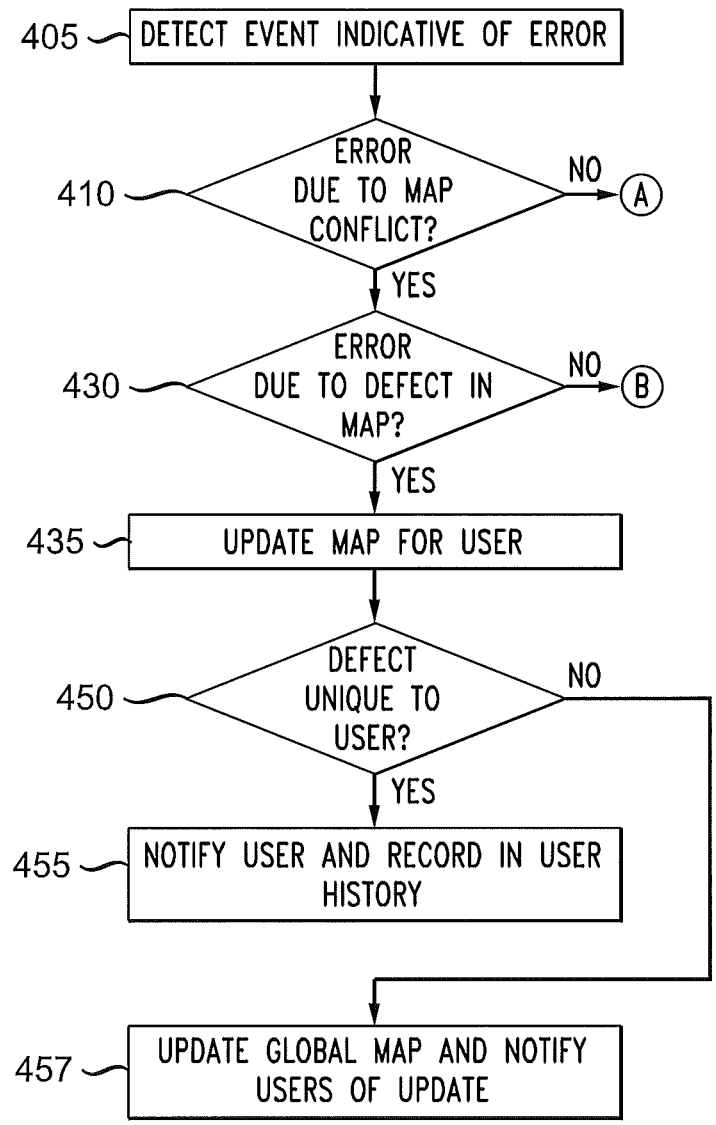
FIGS. 4A-4C illustrate an example of a method for providing optimized location information according to an illustrative embodiment.
Figure 4B:
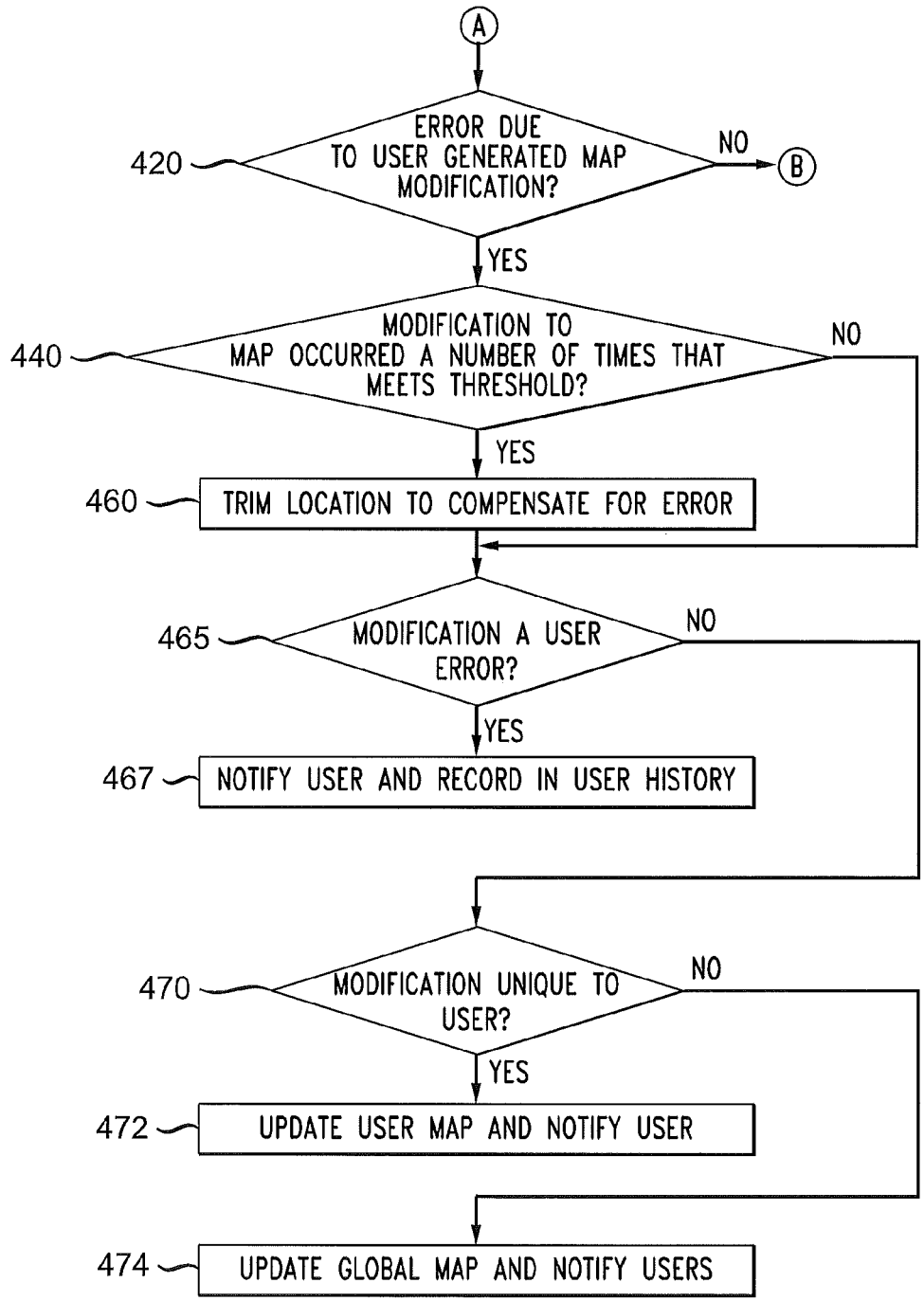
Figure 4C:
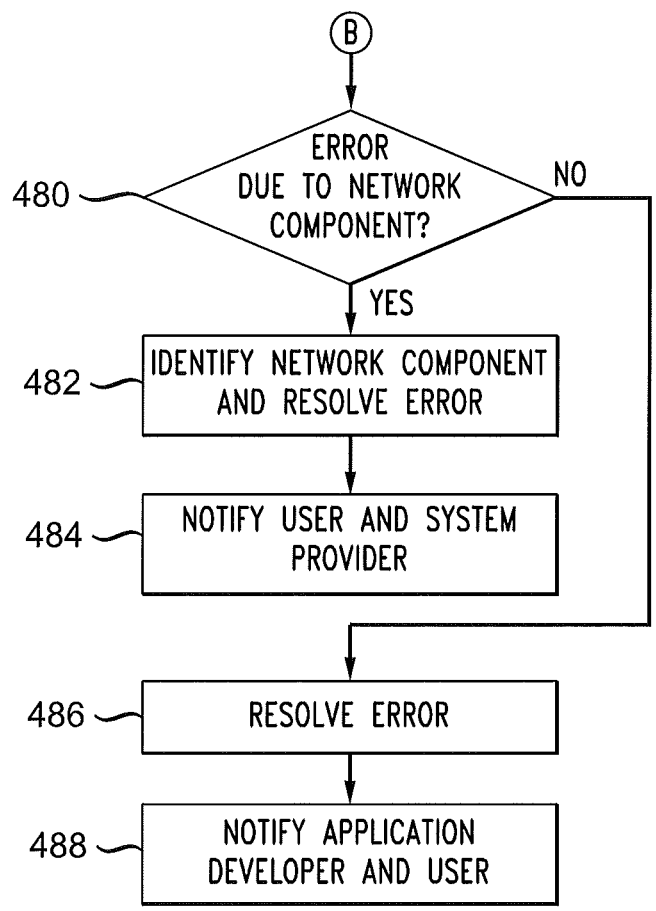

FIGS. 4A-4C illustrate an example of a method for providing optimized location information according to an illustrative embodiment. In the example illustrated, error detection and correction is performed by the location information optimizing server 140. However, it should be appreciated that error detection and correction may be performed in part or entirely by an application on a mobile device, e.g., an application executing on the mobile communication devices 110A, 110B, 110C, and 110D. Further while the example illustrated is directed to detecting and correcting an error due to a conflict between a map and a location of a mobile communication device, a user-generated modification to a map, or an error caused by the location system, it should be appreciated, that similar steps may be taken for other errors, e.g., movements of a mobile communication device inconsistent with a map and user-reported errors.

Referring to FIG. 4A, at step 405, an event indicative of an error in location information is detected. The event may be detected by, for example, the location information optimizing server 140 receiving information from a mobile communication device, such as the mobile communication device 110A, reporting the event. Alternatively, the event may be detected by the location information optimizing server 140 monitoring the mobile communication device 110A.

At step 410, a determination is made by the location information optimizing server 140 whether the error is due to a conflict between a map provided at the mobile communication device and actual location data. If not, the process proceeds to process A, described with reference to FIG. 4B.

If, at step 410, the location information optimizing server 140 determines the error is due to a conflict in the map, the process proceeds to step 430 at which the location information optimizing server 140 determines whether the error is due to a defect in the map. If at step 430, the location information optimizing server 140 determines that the error is not due to a defect in the map, the process proceeds to process B, described with reference to FIG. 4C. If, at step 430, the location information optimizing server 140 determines that the error is due to a defect in the map, the process proceeds to step 435, at which a corrected map or an alternative map (e.g., a map from a different source) is provided.

From step 435, the process proceeds to step 450, at which the location information optimizing server 140 determines whether the defect in the map is only reported by the user of the mobile communication device 110A. If so, the location information optimizing server 140 notifies the user and records the event in a user history at step 455. If, however, the location information optimizing server 140 determines that the defect in the map is reported by several other mobile communication devices, e.g., mobile communication devices 110B, 110C, and 110D, then the location information optimizing server 140 updates the map globally for all the mobile communication devices 110A, 110B, 110C and 110D and notifies the users of the update at step 457. Alternatively, the map may be updated without notifying the users.

Referring now to FIG. 4B, from a determination at step 410 by the location information optimizing server 140 that the error that caused the detected event is not due to a conflict between a map and actual location data, the process proceeds to step 420. At step 420, the location information optimizing server 140 determines whether the error that caused the event is due to a user generated map modification. If not, the process proceeds to process B described with reference to FIG. 4C.

If, at step 420, the location information optimizing server 140 determines that the error that caused the event is a user generated map modification, the process proceeds to step 440 at which the location information optimizing server 140 determines whether the modification to the map has occurred a number of times that meets a threshold. If so, the location information optimizing server 140 trims or adjusts the map to compensate for the error based on the user generated modification at step 460. From step 460 or a determination at step 440 that the modification has not occurred a number of times that meets the threshold, the process proceeds to step 465 at which a determination is made whether the modification to the map is due to a user error. If so, the user is notified at step 467, and the user error is recorded in the user's history.

If, at step 465 the location information optimizing server 140 determines that the modification is not due to a user error, the process proceeds to step 470. At step 470, the location information optimizing server 140 determines whether the modification is unique to a user of the mobile communication device, e.g., the mobile communication device 110A. If the modification is unique to the mobile communication device, the map of the mobile communication device 110A is updated and the user is notified at step 472. Otherwise, the map is updated globally for all the mobile communication devices, and the users of those devices are notified at step 474.

Referring now to FIG. 4C, from a determination by the location information optimizing server at step 410 that the error is not caused by a map conflict or from a determination at step 420 that the error is not due to a user-generated map modification, the error may be determined to be caused by the location system. For example, the error may result from an inability of the location system to determine the location of a mobile communication device, an inability of the location system to provide a map, etc.

At step 480, the location information optimizing server 140 determines whether the error is caused by a network component of the location system. If not, the location information optimizing server 140 may infer that the error is due to an application in the mobile communication device. So, if the location information optimizing server 140 determines at step 480 that the error is not due to a network component, then at step 486, the location information optimizing server 140 takes actions to resolve, i.e., correct and/or compensate for the error, e.g., directing the mobile communication device to use another application to obtain location based services. At step 488, the location information optimizing server 140 notifies the application developer and/or user.

If, at step 480, the location information optimizing server 140 determines that the error is caused by a network component, then at step 482, the location information optimizing server 140 identifies the network component that caused the error and takes actions to resolve, i.e., correct and/or compensate for the error. For example, the location information optimizing server may direct the mobile communication device to use a different location system. Next, at step 484, the user and/or the location system provider are notified.

It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

According to illustrative embodiments, the value of location information to end users and third parties is significant, as the use of location information continues to grow. Therefore, it is in the interest of end users, third parties, application providers, wireless providers, system providers, and system component providers to have systems and methods in place to identify, isolate, and correct problems with location based applications and services. The failure to correct such problems, whether the problems are real or perceived by the end user, will limit the growth and adoption of location based services, resulting in less revenue for all entities negated in this industry sector.

The concepts describe herein address these problems, ensuring that end users and other entities that rely on location based services can rely on and maximize the use of such services. The problem identification, isolation and resolution concepts described above not only assure that existing location based services will function properly, but also create new opportunities for offering enhanced location based services.

The law does not require and it is economically prohibitive to illustrate and teach every possible embodiment of the present claims. Hence, the above-described embodiments are merely illustrations of implementations set forth for a clear understanding of the claimed subject matter. Variations, modifications, and combinations may be made to the above-described embodiments without departing from the scope of the claims. All such variations, modifications, and combinations are included herein by the scope of this disclosure and the following claims.

What is claimed is:

1. A method comprising:

monitoring, by a server comprising a processor, a mobile communication device to detect a modification made by a user of the mobile communication device to a map provided to the user by a location based service executing on the mobile communication device, wherein the user of the mobile communication device makes the modification to the map via user input to the mobile communication device receiving, by the server, information indicative of an error in location information experienced by the mobile communication device, wherein the error in the location information degrades performance of the location based service determining, by the server, whether the modification to the map made by the user of the mobile communication device is causing the error in the location information experienced by the mobile communication device, wherein determining whether the modification to the map made by the user of the mobile communication device is causing the error in the location information experienced by the mobile communication device is based, at least in part, on whether any users of other mobile communication devices located within an area associated with the modification to the map alters the map in a manner that corresponds to the modification made by the user of the mobile communication device such that if none of the users of the other mobile communication devices within the area associated with the modification to the map alters the map in a manner that corresponds to the modification made by the user of the mobile communication device, a determination is made that the modification to the map made by the user of the mobile communication device is causing the error in the location information experienced by the mobile communication device; and in response to determining that the modification to the map made by the user of the mobile communication device is causing the error, initiating, by the server, resolution of the error by not altering the map in accordance with the modification, wherein an amount of time taken to initiate resolution of the error is based, at least in part, on a status of the mobile communication device, wherein a first amount of time is taken to initiate resolution of the error based on a determination that the status of the mobile communication device indicates that the mobile communication device is stationary and not executing any location based applications, and wherein a second amount of time is taken to initiate resolution of the error based on a determination that the status of the mobile communication device indicates that the mobile communication device is moving and is executing one of the location based applications.

2. The method of claim 1, further comprising determining, in response to determining that the modification to the map made by the user of the mobile communication device is not causing the error, whether a conflict between the map and an actual location of the user of the location based service is causing the error.

3. The method of claim 1, further comprising determining, in response to determining that the modification to the map made by the user of the mobile communication device is not causing the error, whether a location system providing the location information for the location based service is causing the error.

4. The method of claim 2, further comprising, responsive to determining that the conflict between the map and the actual location of the user of the location based service is causing the error, determining whether the error caused by the map is associated with a plurality of users, wherein initiating resolution of the error comprises updating the map for the plurality of users in response to determining that the error caused by the map is associated with the plurality of users.

5. The method of claim 3, wherein the location system includes a plurality of network components and an application executing on the mobile communication device, and wherein the method further comprises determining, in response to determining that the location system providing the location information for the location based service is causing the error, whether the error is caused by a network component among the plurality of network components or the application executing on the mobile communication device, wherein if the error is determined to be caused by the network component, initiating resolution of the error comprises selecting a different location system to provide the location information for the location based service, and wherein if the error is determined to be caused by the application executing on the mobile communication device, initiating resolution of the error comprises directing the mobile communication device to execute a different application.

6. The method of claim 2, further comprising modifying the map or selecting an alternative map source, responsive to determining that the conflict between the map and the actual location of the user of the location based service is causing the error.

7. The method of claim 1, further comprising determining whether the error is of a magnitude that meets a threshold, wherein determining a cause of the error and initiating resolution of the error are performed depending upon whether the magnitude of the meets the threshold.

8. A non-transitory computer readable storage device having instructions stored thereon which, when executed by a processor of a server, cause the processor to perform operations comprising:
  monitoring a mobile communication device to detect a modification made by a user of the mobile communication device to a map provided to the user by a location based service executing on the mobile communication device, wherein the user of the mobile communication device makes the modification to the map via user input to the mobile communication device;
  receiving information indicative of an error in location information experienced by the mobile communication device, wherein the error in the location information degrades performance of the location based service;
  determining whether the modification to the map made by the user of the mobile communication device is causing the error in the location information experienced by the mobile communication device, wherein determining whether the modification to the map made by the user of the mobile communication device is causing the error in the location information experienced by the mobile communication device is based, at least in part, on whether any users of other mobile communication devices located within an area associated with the modification to the map alters the map in a manner that corresponds to the modification made by the user of the mobile communication device such that if none of the users of the other mobile communication devices within the area associated with the modification to the map alters the map in a manner that corresponds to the modification made by the user of the mobile communication device, a determination is made that the modification to the map made by the user of the mobile communication device is causing the error in the location information experienced by the mobile communication device; and
  in response to determining that the modification to the map made by the user of the mobile communication device is causing the error, initiating resolution of the error by not altering the map in accordance with the modification, wherein an amount of time taken to initiate resolution of the error is based, at least in part, on a status of the mobile communication device, wherein a first amount of time is taken to initiate resolution of the error based on a determination that the status of the mobile communication device indicates that the mobile communication device is stationary and not executing any location based applications, and wherein a second amount of time is taken to initiate resolution of the error based on a determination that the status of the mobile communication device indicates that the mobile communication device is moving and is one of the location based applications.

9. The non-transitory computer readable storage device of claim 8, wherein the operations further comprise determining, in response to determining that the modification to the map made by the user of the mobile communication device is not causing the error, whether a conflict between the map and an actual location of the user of the location based service is causing the error.

10. The non-transitory computer readable storage device of claim 9, wherein the operations further comprise responsive to determining that the conflict between the map and the actual location of the user of the location based service is causing the error, determining whether the error caused by the map is associated with a plurality of users, wherein initiating resolution of the error comprises updating the map for the plurality of users in response to determining that the error caused by the map is associated with the plurality of users.

11. The non-transitory computer readable storage device of claim 8, wherein the operations further comprise:
  determining, in response to determining that the modification to the map made by the user of the mobile communication device is not causing the error, whether a location system providing the location information for the location based service is causing the error, wherein the location system includes a plurality of network components and an application executing on the mobile communication device; and
  determining, in response to determining that the location system providing the location information for the location based service is causing the error, whether the error is caused by a network component among the plurality of network components or the application executing on the mobile communication device, wherein if the error is determined to be caused by the network component, initiating resolution of the error comprises selecting a different location system to provide the location information for the location based service, and wherein if the error is determined to be caused by the application executing on the mobile communication device, initiating resolution of the error comprises directing the mobile communication device to execute a different application.

12. The non-transitory computer readable storage device of claim 9, wherein the operations further comprise modifying the map or selecting an alternative map source, responsive to determining that the conflict between the map and the actual location of the user of the location based service is causing the error.

13. A server comprising:
a processor; and
a memory storing instructions that, when executed by the processor, cause the processor to perform operations comprising
monitoring a mobile communication device to detect a modification made by a user of the mobile communication device to a map provided to the user by a location based service executing on the mobile communication device, wherein the user of the mobile communication device makes the modification to the map via user input to the mobile communication device,
receiving information indicative of an error in location information experienced by the mobile communication device, wherein the error in the location information degrades performance of the location based service,
determining whether the modification to the map made by the user of the mobile communication device is causing the error in the location information experienced by the mobile communication device, wherein determining whether the modification to the map made by the user of the mobile communication device is causing the error in the location information experienced by the mobile communication device is based, at least in part, on whether any users of other mobile communication devices located within an area associated with the modification to the map alters the map in a manner that corresponds to the modification made by the user of the mobile communication device such that if none of the users of the other mobile communication devices within the area associated with the modification to the map alters the map in a manner that corresponds to the modification made by the user of the mobile communication device, a determination is made that the modification to the map made by the user of the mobile communication device is causing the error in the location information experienced by the mobile communication device, and
in response to determining that the modification to the map made by the user of the mobile communication device is causing the error, initiating resolution of the error by not altering the map in accordance with the modification, wherein an amount of time taken to initiate resolution of the error is based, at least in part, on a status of the mobile communication device, wherein a first amount of time is taken to initiate resolution of the error based on a determination that the status of the mobile communication device indicates that the mobile communication device is stationary and not executing any location based applications, and wherein a second amount of time is taken to initiate resolution of the error based on a determination that the status of the mobile communication device indicates that the mobile communication device is moving and is executing one of the location based applications.

14. The server of claim 13, wherein the operations further comprise determining, in response to determining that the modification to the map made by the user of the mobile communication device is not causing the error, whether a conflict between the map and an actual location of the user of the location based service is causing the error.

15. The server of claim 14, wherein the operations further comprise responsive to determining that the conflict between the map and the actual location of the user of the location based service is causing the error, determining whether the error caused by the map is associated with a plurality of users, wherein initiating resolution of the error comprises updating the map for the plurality of users in response to determining that the error caused by the map is associated with the plurality of users.

16. The server of claim 14, wherein the operations further comprise modifying the map or selecting an alternative map source, responsive to determining that the conflict between the map and the actual location of the user of the location based service is causing the error.

17. The server of claim 13, wherein the operations further comprise:
determining, in response to determining that the modification to the map made by the user of the mobile communication device is not causing the error, whether a location system providing the location information for the location based service is causing the error, wherein the location system includes a plurality of network components and an application executing on the mobile communication device; and
determining, in response to determining that the location system providing the location information for the location based service is causing the error, whether the error is caused by a network component among the plurality of network components or the application executing on the mobile communication device, wherein if the error is determined to be caused by the network component, initiating resolution of the error comprises selecting a different location system to provide the location information for the location based service, and wherein if the error is determined to be caused by the application executing on the mobile communication device, initiating resolution of the error comprises directing the mobile communication device to execute a different application.

* * * * *